Patented Apr. 10, 1934

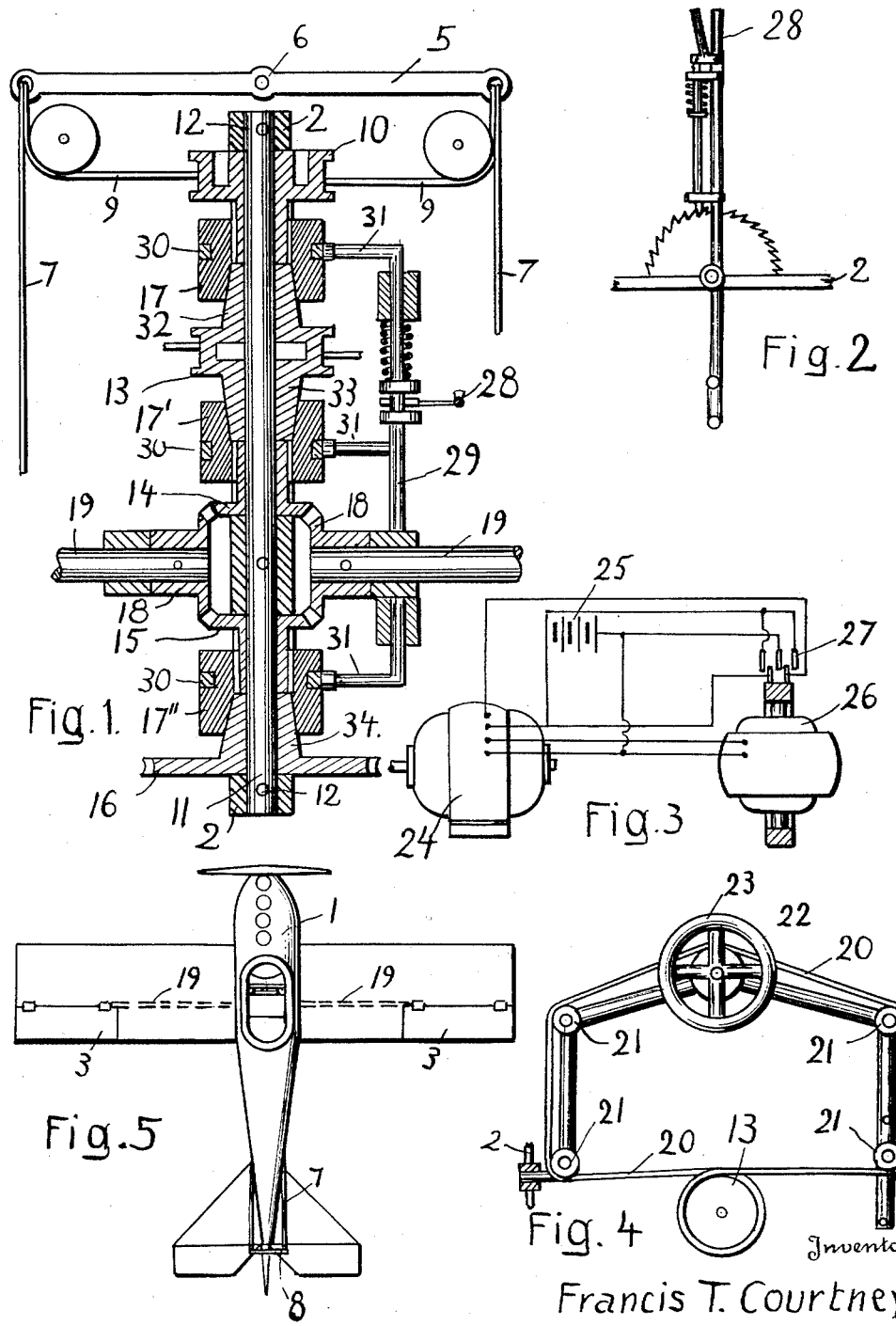

1,954,727

UNITED STATES PATENT OFFICE 1,954,727

AIRCRAFT

Francis T. Courtney, New York, N. Y.

Application December 2, 1932, Serial No. 645,468

8 Claims. (Cl. 244—29)

This invention relates to airplanes with three controls, a longitudinal control, such as one elevator, a lateral control, such as a pair of ailerons, and a directional control, such as one rudder. The invention relates more particularly to the steering assembly in such airplane provided for the manipulation of its three controls. The conventional steering assembly for a manual actuation of the controls comprises one hand operated manipulator, such as a control wheel, operatively connected with the elevator and with the ailerons, and a foot operated manipulator, such as a rudder bar, operatively connected with the rudder. There have also become known automatic manipulators, also called automatic pilots or robots. They are devices making use of physical effects such as air forces, mass forces, magnetic forces, gravity forces, or of several such forces in combination, and translating their effect to the controls. They regulate the control displacement without any action of the pilot, either directly through some transmission, or indirectly by the interposition of some servo motor, actuating the control and being itself steered by the automatic manipulator. Single automatic manipulators actuate one of the three controls only, the other two controls being manually operated. Multiple automatic manipulators actuate two or all three controls. Automatic manipulators may be used selectively with manual control. During pronounced maneuvers, for instance, the pilot may operate the controls manually. During steady flight, he may relieve himself from a part or from all of his steering duties by turning the controls over to an automatic manipulator.

The conventional steering assembly is not equally well suited for all conditions of flight. It is well suited for pronounced maneuvering, because then the controls actuated by hand are the ones requiring frequent and sensitive steering, and the control actuated by foot requires infrequent and coarse steering, since the hands are better suited and more enduring for frequent and fine steering than the feet are. Observation and meditation has taught me that for the same reason the conventional steering method is not the best suited for even and prolonged flying. Experience has convinced me that during such steady travelling, the lateral control assumes second importance, requiring less frequent and coarser steering only, and the directional control assumes a larger importance, and requires frequent and fine steering. It will therefore constitute an improvement to use the conventional steering arrangement selectively only and only during pronounced maneuvering, and to turn the directional control over to the hands while the airplane is steadily travelling ahead. With an entirely manually operated steering assembly, the advantages of this improvement may be upset by the disadvantages of additional complications in its design and in its operation. The introduction of selectively used automatic control manipulators involves anyhow additional complication. It appears therefore to me a valuable improvement to combine the introduction of an automatic pilot with an improved coordination between the control manipulators and the controls. This coordination would also be influenced by the consideration that an automatic manipulator can be more safely relied on to give coarse and infrequent steering actions than to give frequent and sensitive ones.

It is accordingly the broad object of this invention to provide for a steering assembly in an aircraft, in which the operative connection between the controls and the control manipulators can be exchanged or commuted by the the pilot, in order to assign one manipulator selectively to different controls, to whichever it is best suited under the flying conditions then present.

It is more particularly an object of the present invention to provide for a steering assembly in an aircraft which permits the relief of the pilot's feet from the duty to steer a specific control by turning that control over to the pilot's hands.

Even more specially is it an object of this invention to provide for a steering assembly in an aircraft with three conventional controls in which at the pilot's choice the lateral control is operated by hand while the directional control is operated by foot, or, the lateral control is operated automatically while the directional control is operated by hand.

These and other desirable objects and advantages of the present invention will be illustrated in the accompanying drawing and described in the specification, this preferred embodiment being disclosed by way of illustration only, for, since the underlying principles may be incorporated in other specific devices, it is not intended to be limited to the one here shown except as such limitations are clearly imposed by the appended claims.

In the drawing like numerals refer to similar parts throughout the several views, of which Fig. 1 represents a horizontal section through a steering assembly of an otherwise conventional low wing monoplane, the line of flight extending from bottom to top of the drawing.

Fig. 2 represents an elevation of the steering shift lever, as seen by the pilot on his right side, Fig. 3 represents schematically in elevation an automatic control manipulator, Fig. 4 represents the elevation of the control bridge seen in direction of flight, and Fig. 5 represents the top view of the entire airplane, containing the illustrated steering assembly.

To the frame work 2 of the fuselage 1 of the airplane Fig. 5 is pivoted the rudder bar 5 at the pivot point 6. Its two ends are connected to the rudder horns 8 by the two cables 7. Its two ends are further connected to the rudder drum 10 through the cables 9. Said rudder drum is rotatively mounted on the axle 11, fastened to the framework 2 at the points 12. The axle 11 is parallel to the line of flight, and has rotatively mounted on it said rudder drum 10, the control bridge drum 13, two bevel gears 14 and 15, and a worm gear 16. The rudder drum 10 and the two bevel gears 14 and 15 carry axially slidable but not rotatable the friction coupling sleeves 17, 17' and 17", adapted to couple them respectively with the bridge drum and with the worm gear, by binding frictionally with respective conical extensions 32, 33, and 34. The bevel gears 14 and 15 are permanently in mesh with the two bevel gears 18, keyed to the two shafts 19 which in turn extend to the ailerons 3 and are rigidly coupled thereto. Cables 20 guided by pulleys 21 gear the bridge drum 13 to control wheel drum 22, which latter turns integral with control wheel 23. Worm gear 16 is driven by a worm keyed to the shaft of an electric motor 24. This motor derives its energy from a storage battery 25, and is controlled by the gyroscope 26 through the contact switch 27. The axis of the gyroscope is vertical, and it swivels about a horizontal axis. All friction coupling sleeves 17 can be shifted at the same time by the steering shift lever 28, supported by the fuselage frame 2. Through arms 31 a shifting rod 29 meshes with the friction sleeves 17 through the sleeve rings 30 rotatively mounted on the sleeves. Rod 29 is in mesh with the lower end of lever 28.

If the steering shift lever 28 is pulled to the rear, it engages through shifting rod 29 and friction clutches 33 the bridge drum with the bevel gear, and thereby the steering wheel 28 with the ailerons 3. The other two friction clutches 32 and 34 are at the same time released, and thereby is the worm gear 16 and hence the automatic manipulator 24 to 27 disengaged from all controls. The entire steering assembly functions therefore like a conventional one. However, if the shift lever 28 is pushed to the front, the front and rear friction clutches 32 and 34 become engaged, and the center clutch 33 becomes disengaged. The rudder bar becomes thereby engaged with the bridge drum, and hence with the control wheel. The worm gear becomes engaged with the bevel gear, and hence the automatic manipulator with the rudder. The operation of the three controls is thereby converted or commuted from the conventional operation into a conventional operated elevator, hand operated rudder and automatically operated ailerons. In particular, the control wheel is uncoupled from the ailerons and coupled to the rudder.

I claim:

1. An aircraft comprising a body, sustaining means, propelling means, a plurality of independent controls, a plurality of control manipulators, and transmission elements connecting the manipulators to the controls, including clutches for selectively connecting a transmission element to two controls.

2. An aircraft comprising a body, sustaining means, propelling means, a longitudinal control, a lateral control, a directional control, a plurality of control manipulators, and transmission elements connecting the manipulators to the controls including clutches for selectively connecting a transmission element to two controls, whereby all controls remain independent.

3. An aircraft comprising a body, sustaining means, propelling means, a longitudinal control, a lateral control, a directional control, a plurality of control manipulators including a hand operated manipulator, and transmission elements connecting the manipulators to the controls, including clutches for selectively connecting a transmission element actuated by the hand operated manipulator to the lateral or to the directional control, whereby all controls remain independent.

4. An aircraft comprising a body, sustaining means, propelling means, a single automatic manipulator, a hand operated manipulator, a foot operated manipulator, a longitudinal control actuated by the hand operated manipulator, a directional control adapted to be actuated by the foot operated manipulator, a lateral control adapted to be actuated by the hand operated manipulator, and clutching means for disengaging the lateral control from the hand operated manipulator, for engaging it with the automatic manipulator, and for engaging the directional control with the hand operated manipulator.

5. An aircraft comprising a body, sustaining means, propelling means, a longitudinal control organ, a set of lateral control organs, a directional control organ, a hand operated control manipulator, a foot operated control manipulator, an automatic control manipulator, means for keeping engaged at the same time the longitudinal and the lateral control organs to the hand operated manipulator and the directional control organ to the foot operated manipulator, and means for keeping engaged at the same time the lateral control organs to the automatic manipulator and the longitudinal and the directional control organs to the hand operated manipulator.

6. An aircraft comprising a body, sustaining means, propelling means, a longitudinal control, a lateral control, a directional control, a hand operated manipulator, a foot operated manipulator, an automatic manipulator, and selective means for either keeping engaged at the same time the longitudinal and lateral controls to the hand operated manipulator and the directional control to the foot operated manipulator, or, the lateral control to the automatic manipulator, the longitudinal and directional controls to the hand operated manipulator, and the directional control to the foot operated manipulator.

7. An aircraft comprising a body, sustaining means, propelling means, a longitudinal control, a lateral control, a directional control, a hand operated manipulator, a foot operated manipulator, an automatic manipulator, and selective means for either keeping engaged at the same time the longitudinal and lateral controls to the hand operated manipulator and the directional control to the foot operated manipulator, or, the lateral control to the automatic manipulator, the longitudinal and directional controls to the hand operated manipulator, and the directional control to the foot operated manipulator, whereby in either engagement each of the three controls remains independently movable of the other two.

8. In an airplane a steering assembly comprising an axle, an element rotatably mounted on the axle adapted to be rotated by the pilot, an element rotatably mounted on the axle adapted to be rotated by an automatic manipulator, an element rotatably mounted on the axle adapted to actuate ailerons, an element rotatably mounted on the axle adapted to actuate a rudder, and clutches adapted to couple selectively the hand operated element to the aileron actuating element, or, the hand operated element to the rudder actuating element and the automatically operated element to the aileron actuating element.

FRANCIS T. COURTNEY.